US012622412B2

(12) United States Patent
Posthumus et al.

(10) Patent No.: US 12,622,412 B2
(45) Date of Patent: *May 12, 2026

(54) OVERHEAD ANIMAL FEED LOADING, TRANSPORTING AND MIXING SYSTEM

(71) Applicants: Albert Posthumus, Stephenville, TX (US); Ben Posthumus, Stephenville, TX (US)

(72) Inventors: Albert Posthumus, Stephenville, TX (US); Ben Posthumus, Stephenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,732

(22) Filed: Jul. 5, 2024

(65) Prior Publication Data

US 2024/0357993 A1 Oct. 31, 2024

Related U.S. Application Data

(63) Continuation of application No. 16/922,125, filed on Jul. 7, 2020, now Pat. No. 12,029,203, which is a continuation of application No. 15/650,211, filed on Jul. 14, 2017, now Pat. No. 10,750,718.

(60) Provisional application No. 62/363,105, filed on Jul. 15, 2016.

(51) Int. Cl.
*A01K 5/00* (2006.01)
*A01K 5/01* (2006.01)
*A01K 5/02* (2006.01)

(52) U.S. Cl.
CPC ............ *A01K 5/001* (2013.01); *A01K 5/0107* (2013.01); *A01K 5/0208* (2013.01); *A01K 5/0266* (2013.01)

(58) Field of Classification Search
CPC ..... A01K 5/001; A01K 5/0107; A01K 5/0266
See application file for complete search history.

(56) References Cited

U.S. PATENT DOCUMENTS

| | | | |
|---|---|---|---|
| 5,088,873 A | 2/1992 | Ruder et al. | |
| 5,356,214 A | 10/1994 | Styles | |
| 5,505,160 A | 4/1996 | Pellerin | |
| 5,816,192 A | 10/1998 | Van Der Lely et al. | |
| 6,779,486 B2 * | 8/2004 | Vaags | A01K 61/80 |
| | | | 119/51.02 |
| 7,261,054 B2 * | 8/2007 | Van Den Berg | A01K 1/126 |
| | | | 119/14.03 |
| 8,651,408 B1 | 2/2014 | Fox | |

(Continued)

FOREIGN PATENT DOCUMENTS

| | | |
|---|---|---|
| FR | 2921227 A1 | 3/2009 |
| WO | WO-2013/157928 A1 | 10/2013 |
| WO | WO-2013/164785 A2 | 11/2013 |

OTHER PUBLICATIONS

Crane Components, Total Crane Systems, Inc., downloaded from http://www.totalcrane.com/cranecomp.rhtml Jun. 30, 2014, 2 pgs.

(Continued)

*Primary Examiner* — Elizabeth Insler
(74) *Attorney, Agent, or Firm* — Foley & Lardner LLP

(57) ABSTRACT

According to embodiments disclosed herein, there is provided a system for loading, mixing and transporting feed. The system includes a scoop assembly and a mixing tub that are movable overhead a series of storage bays. The scoop assembly may retrieve commodities from the storage bays and load measured quantities of the commodities into the mixing tub.

20 Claims, 12 Drawing Sheets

(56) References Cited

U.S. PATENT DOCUMENTS

| | | | |
|---|---|---|---|
| 2005/0158158 A1 | 7/2005 | Porta | |
| 2006/0045660 A1 | 3/2006 | Di Rosa | |
| 2014/0029375 A1 | 1/2014 | Liet | |
| 2015/0075436 A1* | 3/2015 | Wisse | G05D 1/021 |
| | | | 119/57.92 |
| 2015/0104273 A1* | 4/2015 | Van Kuilenburg | B65G 67/04 |
| | | | 414/21 |
| 2015/0136886 A1* | 5/2015 | Liet | A01K 5/005 |
| | | | 241/101.6 |
| 2015/0230427 A1 | 8/2015 | Wisse et al. | |
| 2016/0023867 A1 | 1/2016 | Posthumus | |

OTHER PUBLICATIONS

International Preliminary Report on Patentability issued Jan. 24, 2019 in PCT/US2017/042149, 7 pages.
International Preliminary Report on Patentability issued Jan. 31, 2017 in PCT/US2015/041482, 8 pages.
International Search Report and Written Opinion in International Patent Application No. PCT/US2017/042149 mailed Dec. 22, 2017, 11 pages.
International Search Report and Written Opinion mailed Jan. 4, 2016 in corresponding PCT/US2015/41482, 12 pages.
Triotrac Brochure, Self-Propelled Mixer Feeder Model 1700-2000-2400, downloaded from http://www.trioliet.com/fileadmin/images/brochures/Mixer_feeders/Triotrac/Triotrac_Engels.pdf Aug. 29, 2014, 6 pgs.
Your Stationary Specialist, Mixer Center, Stephenville, TX, Nov. 1, 2013, 8 pgs.

* cited by examiner 55-2

55-1

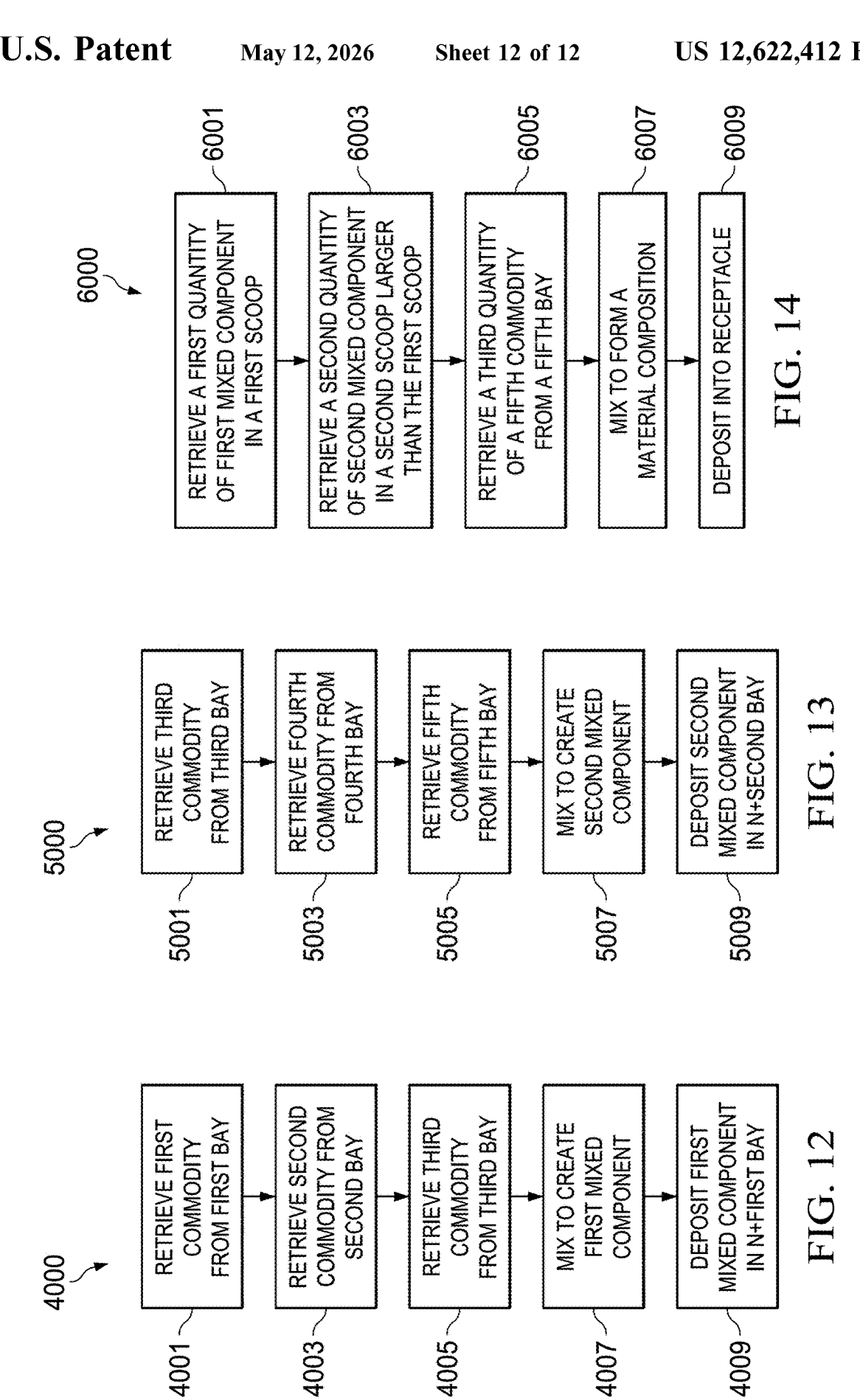

6000

6001 RETRIEVE A FIRST QUANTITY OF FIRST MIXED COMPONENT IN A FIRST SCOOP

6003 RETRIEVE A SECOND QUANTITY OF SECOND MIXED COMPONENT IN A SECOND SCOOP LARGER THAN THE FIRST SCOOP

6005 RETRIEVE A THIRD QUANTITY OF A FIFTH COMMODITY FROM A FIFTH BAY

6007 MIX TO FORM A MATERIAL COMPOSITION

6009 DEPOSIT INTO RECEPTACLE

5001 RETRIEVE THIRD COMMODITY FROM THIRD BAY

5003 RETRIEVE FOURTH COMMODITY FROM FOURTH BAY

5005 RETRIEVE FIFTH COMMODITY FROM FIFTH BAY

5007 MIX TO CREATE SECOND MIXED COMPONENT

5009 DEPOSIT SECOND MIXED COMPONENT IN N+SECOND BAY

4001 RETRIEVE FIRST COMMODITY FROM FIRST BAY

4003 RETRIEVE SECOND COMMODITY FROM SECOND BAY

4005 RETRIEVE THIRD COMMODITY FROM THIRD BAY

4007 MIX TO CREATE FIRST MIXED COMPONENT

4009 DEPOSIT FIRST MIXED COMPONENT IN N+FIRST BAY

FIG. 12

OVERHEAD ANIMAL FEED LOADING, TRANSPORTING AND MIXING SYSTEM

CROSS-REFERENCE TO RELATED APPLICATION

This application is a continuation of U.S. patent application Ser. No. 16/922,125, entitled "OVERHEAD ANIMAL FEED LOADING, TRANSPORTING AND MIXING SYSTEM," filed Jul. 7, 2020, which is a continuation of U.S. patent application Ser. No. 15/650,211, entitled "OVERHEAD ANIMAL FEED LOADING, TRANSPORTING AND MIXING SYSTEM," filed Jul. 14, 2017, now U.S. Pat. No. 10,750,718, which claims priority to, and the benefit of, U.S. Provisional Patent Application Ser. No. 62/363,105 entitled "OVERHEAD ANIMAL FEED LOADING, TRANSPORTING AND MIXING SYSTEM," filed on Jul. 15, 2016, the contents of all of which are hereby incorporated herein by reference in their entirety for any purpose.

TECHNICAL FIELD

This disclosure relates to transporting and mixing feed for animals, and in particular, to a system and method for efficiently loading, transporting and mixing feed.

BACKGROUND OF THE DISCLOSURE

Feed for livestock typically includes a mixture of several different commodities, such as hay, straw and other types of grain, that when mixed together produce a feed product that is customized to the diet of a group of livestock. The various commodities for a specific feed product are retrieved from bulk commodity locations and then mixed in large, stationary mixers. In practice, commodity transportation vehicles retrieve the required commodities from one or more bulk commodity locations and transport the commodities to the location of the stationary feed mixers. The commodity transportation vehicles, or other commodity loading vehicles such as fork lifts or shovel loaders, then load the commodities into the stationary mixers. When the stationary mixers have fully mixed the commodities, the commodities are loaded, for example, into the feed transportation vehicles, such as feed trailers.

The feed production and transportation process described above requires several manually-operated vehicles, fuel to power the vehicles, and trained workers to operate the vehicles. As such, the process is time consuming and expensive for feed producers. In addition, commodities and/or feed are often lost during loading, transportation and unloading of the commodities and/or feed. The loss of a portion of the commodities and/or feed causes significant losses in profitability for feed producers and is often referred to as "shrinkage." In addition, because livestock producers rely on a steady supply of feed from the feed production process, maintenance of the components of the above-described process, such as the stationary mixers, must be performed quickly to minimize downtime. Oftentimes, maintenance of the stationary mixers must be performed at the location of the stationary mixer, regardless of the weather conditions or time of day. On-site maintenance and repair of the mixers or other feed production equipment can be dangerous for technicians, especially when other feed production processes are in operation while the technicians perform maintenance.

SUMMARY

In a first aspect, there is provided a system for loading, mixing and transporting feed. The system includes a feed preparation system. The system may include a primary carriage movable along a track overhead a plurality of commodity bays, and a secondary carriage supported by the primary carriage. The system may further include a first load measurement mechanism disposed interstitially between the primary carriage and secondary carriage and configured to measure a weight associated with the secondary carriage, a scoop array hanging downwardly form the secondary carriage and configured to be controllably raised and lowered to scoop a commodity from a commodity bay, and a mixer assembly hanging from the primary carriage and configured to receive a scooped commodity from the scoop array.

A mixing tub output device is provided. The device may include a rod rotatably attachable to a hinge bracket extending from a side of a mixing tub and a door lever attached to a distal end of the rod and attached to a door. The door lever may be configured to constrain a movement of the door to an actuation pathway comprising an arc with a radius defined by the rod and a center defined by the hinge bracket.

A method of feed preparation is also disclosed. The method may include secondary carriage steps configured to be completed at least partially in parallel with a primary carriage step, wherein the secondary carriage steps include lowering a scoop array into a first commodity bay, closing at least one scoop of the scoop array to pick up commodity material, and raising the scoop array. The secondary carriage steps may also include weighing the scoop array whereby a quantity of commodity material collected is determined, translating the scoop array by at least one scoop carriage to be overhead a mixing tub, and dumping by the scoop array the commodity material into the mixing tub. The secondary carriage steps may also include further translating the scoop array by the first scoop carriage and the second scoop carriage in an opposite direction away from overhead the mixing tub. The primary carriage step may include translating the scoop array and mixing tub to a second commodity bay whereby the scoop array is staged for collecting further commodity material. In various embodiments, the primary carriage step occurs simultaneously with at least one of the translating, dumping, and further translating steps.

A feed preparation system is provided. The system may include a commodity bay, an overhead track, a primary carriage movable along the overhead track overhead the plurality of commodity bays, a secondary carriage supported by the primary carriage, a scoop array hanging downwardly form the secondary carriage and configured to be controllably raised and lowered to scoop a commodity from the commodity bay, and a mixer assembly hanging from the primary carriage and configured to receive a scooped commodity from the scoop array.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

FIG. 12 is a block diagram of a first premix preparation method;

FIG. 13 is a block diagram of a second premix preparation method; and

FIG. 14 is a block diagram of a rapid feed preparation method.

DETAILED DESCRIPTION

Figure 1:
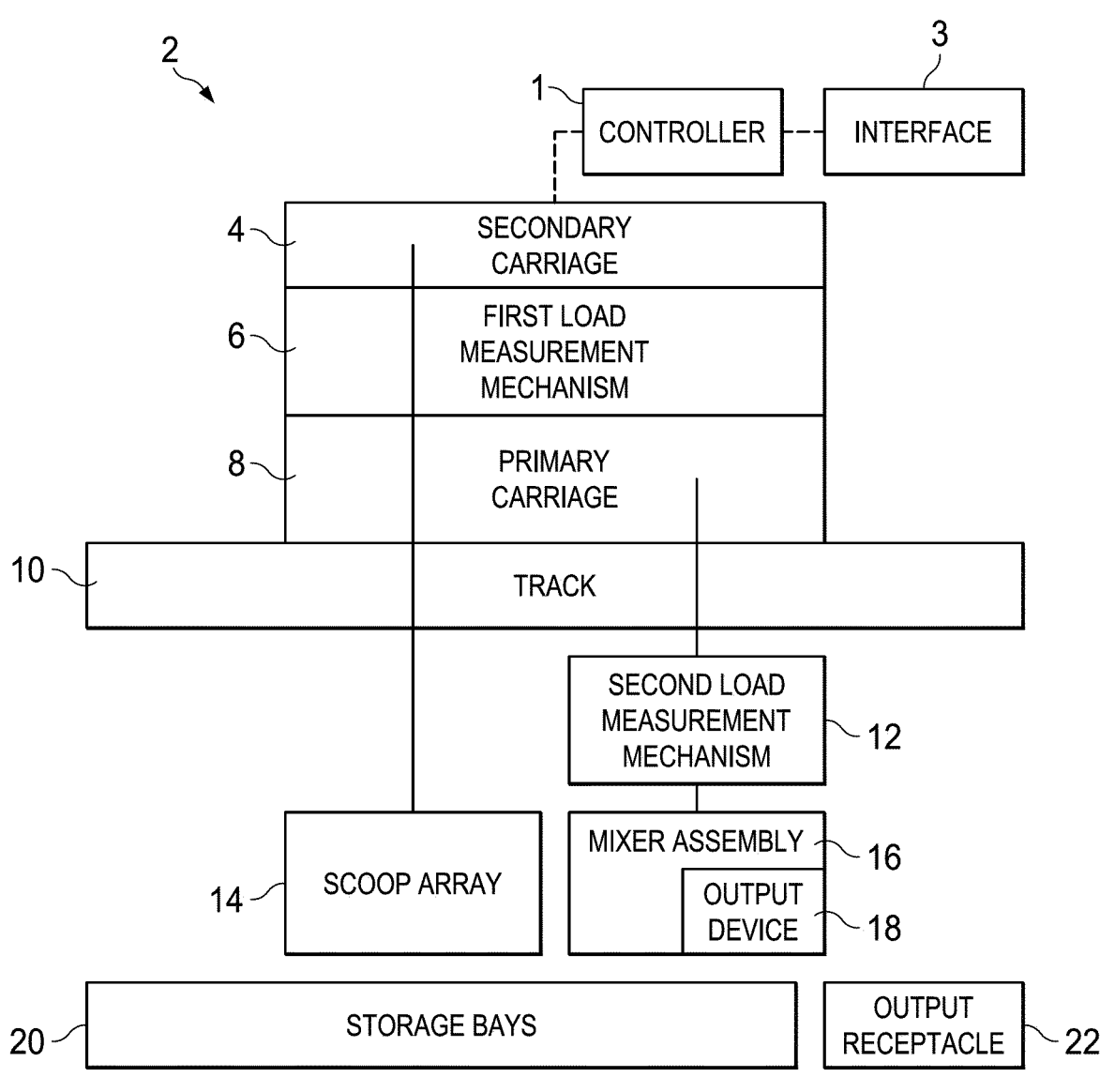
FIG. 1 is a block diagram of a system for mixing and transporting feed in accordance with this disclosure.

FIGS. 1-6 illustrate an embodiment of a feed preparation system 2 for loading, mixing and transporting commodities to create feed for livestock or other animals. The system includes a building that includes a plurality of commodity bays and carriages that are movable with respect to the commodity bays.

The feed preparation system 2 includes a primary carriage 8 that is movable on a track 10 inside the building. The primary carriage 8 may translate along a track 10 comprising a first track rail 11 and second track rail 13 (FIG. 2) overhead the commodity bays, translating from being overhead one commodity bay 20 to another. The primary carriage 8 supports a secondary carriage 4. The secondary carriage 4 is atop the primary carriage 8 and a first load measurement mechanism 6 is disposed between the primary carriage and secondary carriage 4. Various aspects hang from the secondary carriage 4. As such, the weight of the aspects hanging from the secondary carriage 4 may be evaluated by the first load measurement mechanism 6. The secondary carriage 4 may support a scoop array 14 that hangs downwardly toward the storage bays. The scoop array 14 may be controllably raised and lowered, and controllably scoop commodities form the commodity bays 20. Thus, the weight of the scooped commodities may be evaluated by the first load measurement mechanism 6.

A mixer assembly 16 may hang from the primary carriage 8. Because the scoop array 14 hangs form the secondary carriage 4, which is translatable relative to the primary carriage 8, the scoop array 14 may be translated so that after commodities are collected from the commodity bays 20 by the scoop array 14, they may be dumped from the scoop array 14 into the mixer assembly 16. In various embodiments, a second load measurement mechanism 12 is further disposed between the mixer assembly 16 and the primary carriage 8 so that the weight of mixed commodities may be measured.

By controllably translating the primary carriage 8 relative to the storage bays 20, and the secondary carriage 4 relative to the mixer assembly 16, the feed preparation system 2 may perform multiple tasks simultaneously, such as measuring while translating, or dumping commodities into the mixer assembly 16 while translating, and/or the like. Finally, the mixer assembly 16 may be joined with a output device 18 whereby mixed commodities may be deposited back into a commodity bay 20, such as to formulate pre-mixed preparations, or into an output receptacle 22, such as a waiting truck, an auger or elevator system, a bin, and/or the like.

Figure 2:
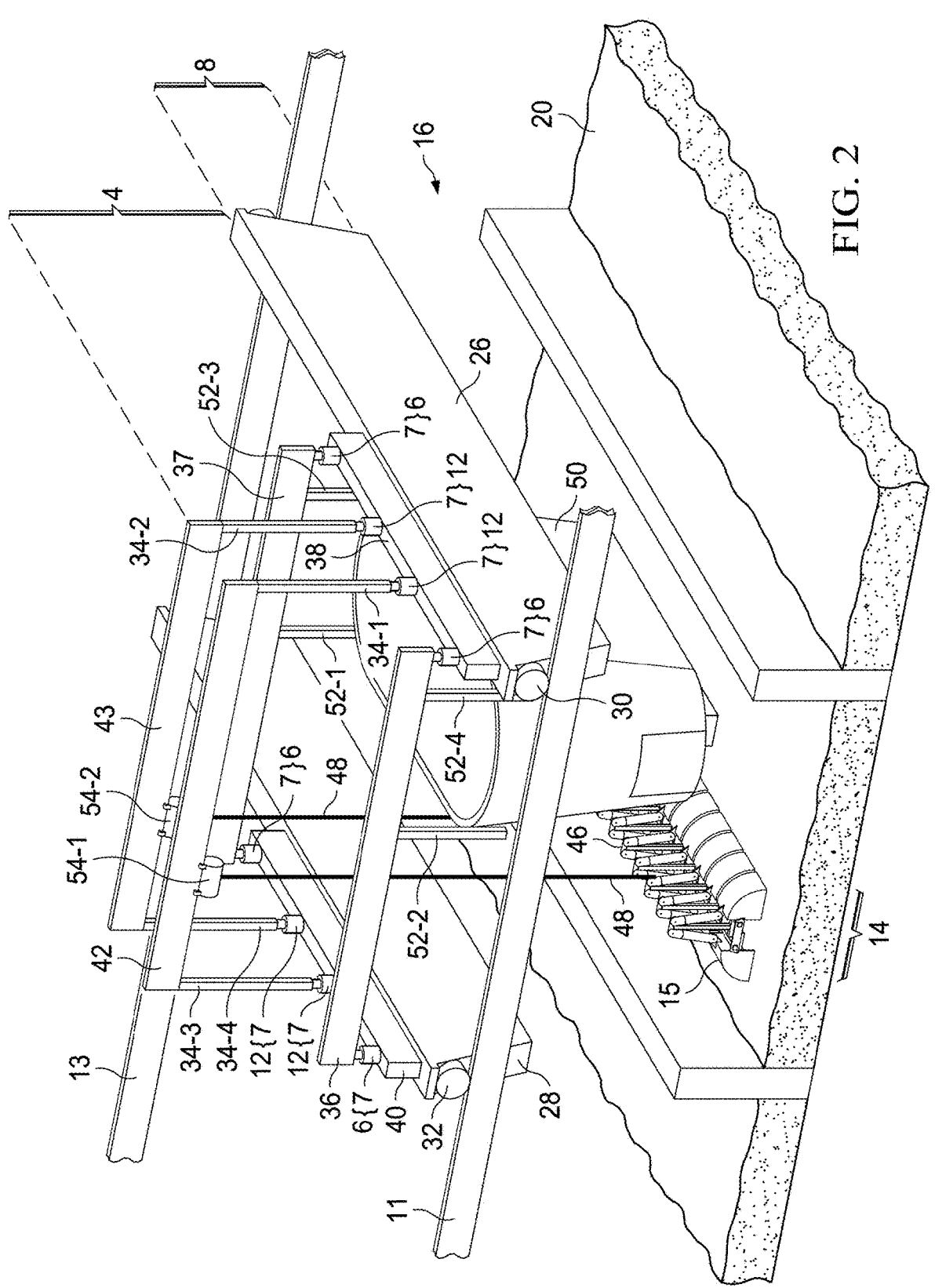
FIG. 2 is a side view of the system for mixing and transporting feed in which the scoop apparatus is in an open scooping position above a floor.
Figure 3:
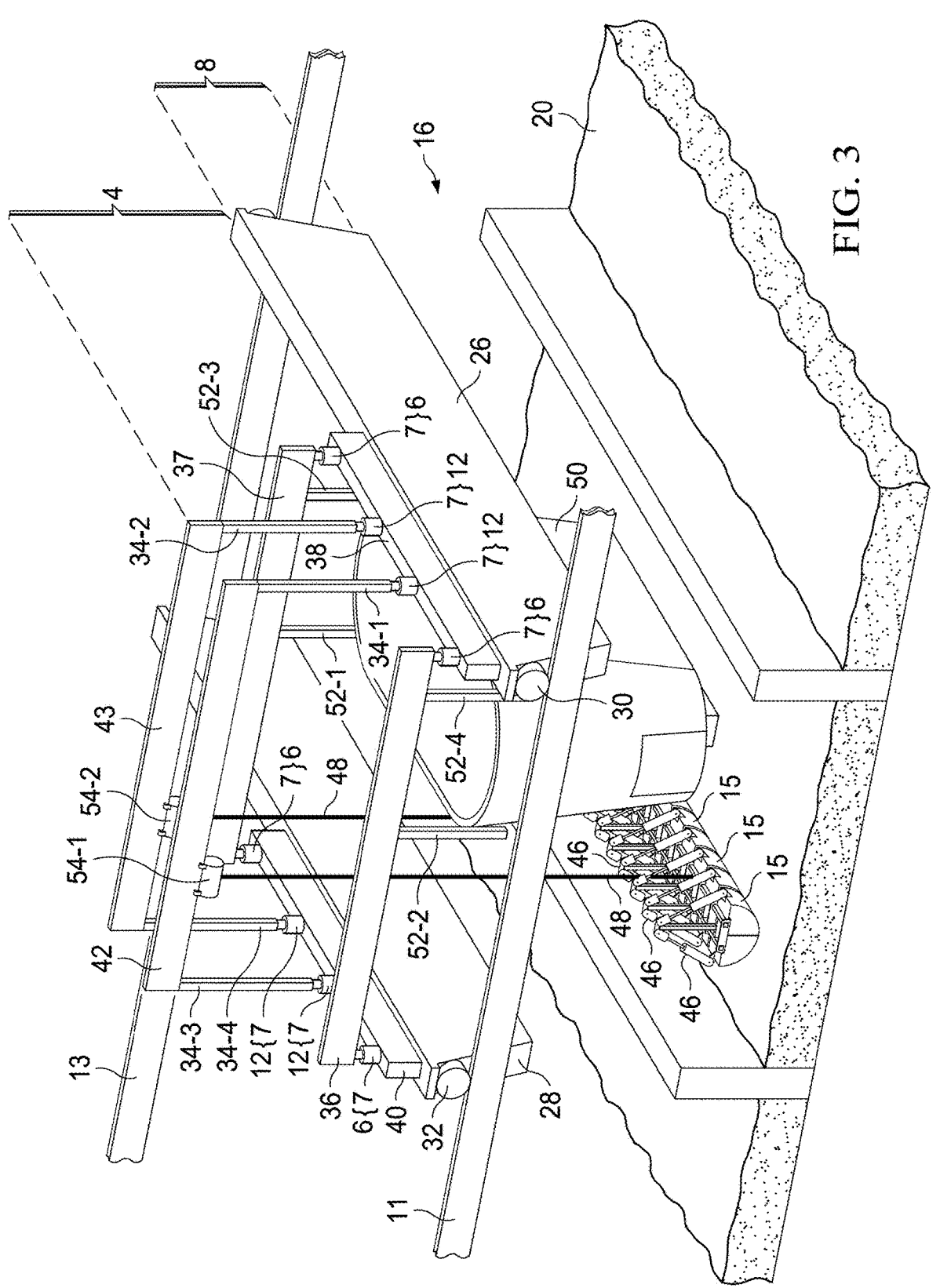
FIG. 3 is a side view of the system for mixing and transporting feed in which the scoop apparatus mixer is in a closed scooping position above the floor.

Having generally discussed various structural aspects of the feed preparation system 2, further attention is now directed to specific components thereof. With reference to FIGS. 1, 2 and 3, a primary carriage 8 is discussed in further detail. A primary carriage may comprise a first transverse support 26 and a second transverse support 28. Each of the first transverse support 26 and second transverse support 28 may comprise a weight bearing member extending laterally across (perpendicularly to) the first track rail 11 and second track rail 13 of the track 10. Thus, the first transverse support 26 may be supported by a first translation system 30 extending from the first transverse support 26 at a first distal end by a first track rail 11 and at a second distal end by a second track rail 13. Similarly, the second transverse support 28 may be supported at a second translation system 32 extending from the second transverse support 28 at a first distal end by a first track rail 11 and at a second distal end by a second track rail 13. The first transverse support 26 and the second transverse support 28 may comprise an I-beam, or a C-channel, or bar stock, or an arbitrary shape as desired. For instance, with reference to FIG. 2, in various embodiments each transverse support 26, 28 may have a trapezoidal profile, tapering away from the first track rail 11 and second track rail 13 in order to provide additional clearance during installation and maintenance.

With momentary focus on the first translation system 30 and second translation system 32, the translation systems 30, 32 may each comprises a electric motor, hydraulic drive, pneumatic drive, or other force imparting mechanism configured to effectuate the translation of the primary carriage 8 along the rails 11, 13 in response to instructions from a controller 1. For instance, a pair of rotatable wheels may support each transverse support 26, 28 on the first track rail 11 and second track rail 13, which may be rotatable to translate the primary carriage 8.

A primary carriage 8 also may comprise a first transverse member 38 and a second transverse member 40. The first transverse member 38 and second transverse member 40 each may parallel the first transverse support 26 and second transverse support 28, respectively. The first transverse member 38 and the second transverse member 40 may each comprise an I-beam, or C-channel, or bar stock, or angle iron, or any arbitrary shape as desired.

The primary carriage 8 may also include a first longitudinal support 36 and a second longitudinal support 37. First longitudinal support 36 may comprise a weight bearing member extending longitudinally parallel to the first track rail 11 and the second longitudinal support 37 may comprise a weight bearing member extending longitudinally parallel to the second track rail 13. Both the first longitudinal support 36 and the second longitudinal support 37 may each be supported at distal ends between the first transverse member 38 and second transverse member 40. Thus, one may see that the first longitudinal supports 36 and the second longitudinal support 37 are both perpendicular to the first transverse member 38 and second transverse member 40.

A first load measurement mechanism 6 is disposed interstitially between the first transverse member 38 and the first and second longitudinal support 36, 37, as well as interstitially between the second transverse member 40 and the first and second longitudinal support 36, 37 and may be in electrical communication with controller 1. The first load measurement mechanism 6 may comprise at least one load cell 7 positioned at each intersection of a transverse member 38, 40 and a longitudinal support 36, 37. As a consequence, the weight supported by the longitudinal supports 36, 37 of the primary carriage 8 may be measured. In further embodiments, any load sensor, such as a strain gauge, weight bar and/or the like may be used.

Directing attention now to the secondary carriage 4, the secondary carriage 4 may comprise a plurality of upright arms 34. For instance, the secondary carriage 4 may comprise a first upright arm 34-1, a second upright arm 34-2, a third upright arm 34-3, and a fourth upright arm 34-4. An upright arm 34-1, 34-2, 34-3, 34-4 may comprise a member extending upwardly from the first transverse member 38 or from the second transverse member 40 of the primary carriage 8. Each upright arm may be proximate to a distal end of a transverse member 38, 40.

A second load measurement mechanism 12 may be disposed interstitially between each upright arm 34-1, 34-2, 34-3, 34-4 and the corresponding transverse member 38, 40 and may be in electrical communication with controller 1. In various embodiments, the second load measurement mechanism 12 comprises a load cell 7 between a transverse member 38, 40 and corresponding distal end of a corresponding upright arm 34-1, 34-2, 34-3, 34-4. In this manner, the weight supported by the secondary carriage 4 may be measured. In further embodiments, any load sensor, such as a strain gauge, weight bar and/or the like may be used.

A first upper track 42 may connect longitudinally between a pair of upright arms, such as the first upright arm 34-1 and the third upright arm 34-3. A second upper track 43 may connect longitudinally between pairs of upright arms, such as the second upright arm 34-2 and the fourth upright arm 34-4. The first upper track 42 and the second upper track 43 each may comprises longitudinally extending track members each configured to support a scoop carriage. For instance, the first upper track 42 may support a first scoop carriage 54-1 and the second upper track 43 may support a second scoop carriage 54-2. The first upper track 42 and the second upper track 43 each comprises an I-beam, or a C-channel, or angle-iron, or any desirable shape and each is oriented longitudinally, parallel to the longitudinal supports 36, 37 and/or perpendicular to the transverse supports 26, 28 and transverse members 38, 40. Thus, one may appreciate that the secondary carriage 4 comprises a structure configured to support one or more movable scoop carriage attached to the upper tracks 42, 43. While a single first scoop carriage 54-1 is depicted in translatable mechanical communication with first upper track 42, and a single second scoop carriage 54-2 is depicted in translatable mechanical communication with the second upper track 43, any number or combination of scoop carriages and upper tracks is possible. For example, only a single scoop carriage 54-1 may be used and coupled to one or two tracks 42 and/or 43.

Finally, as mentioned, the secondary carriage 4 may comprise a first scoop carriage 54-1 and/or a second scoop carriage 54-2. A scoop carriage is a movable apparatus configured to impart a motive force against an upper track in response to instructions from a controller 1. This motive force causes the scoop carriage to move along the upper track. By directing the scoop carriage(s) to move along the upper track 42, the feed preparation system 2 may reposition a scoop array 14 hanging from the scoop carriage(s). For instance, a scoop array 14 may hang at a first end from a first scoop carriage 54-1 and at a second end from a second scoop carriage 54-2. The scoop carriage 54 may comprise an electric motor and optionally a gearbox to generate this motive force, although in further embodiments, a hydraulic actuator, or a linear actuator, or a pneumatic actuator, or any other force exerting mechanism may be implemented. Various aspects of this repositionable feature will be discussed further below.

Having detailed the secondary carriage 4, attention is directed toward the mixer assembly 16. The mixer assembly 16 may comprise a plurality of hangar arms 52-1, 52-2, 52-3, and 52-4 extending downwardly from the secondary carriage 4, for instance, extending downwardly from the longitudinal supports 36. While in FIG. 2, a first hangar arm 52-1, second hangar arm 52-2, third hangar arm 52-3, and fourth hangar arm 52-4 are depicted, any number or arrangement of hangar arms is contemplated. The hangar arms join to and support a mixing tub 50.

Figure 8B:
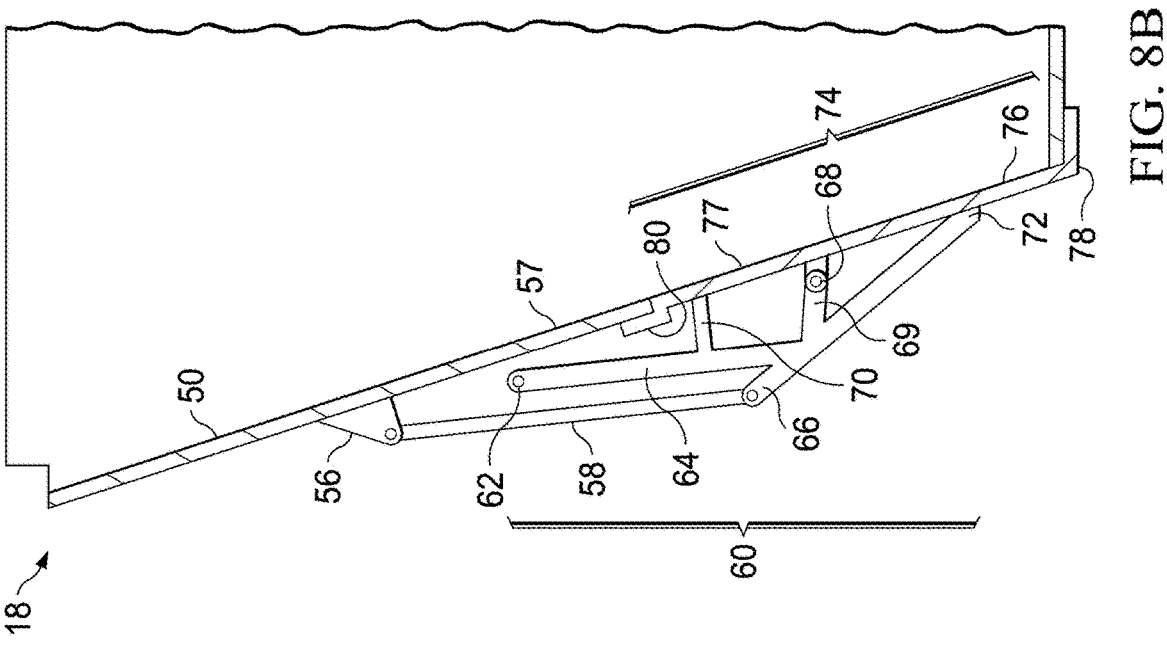
FIGS. 8A-B are views of an embodiment of an output device.
Figure 8A:
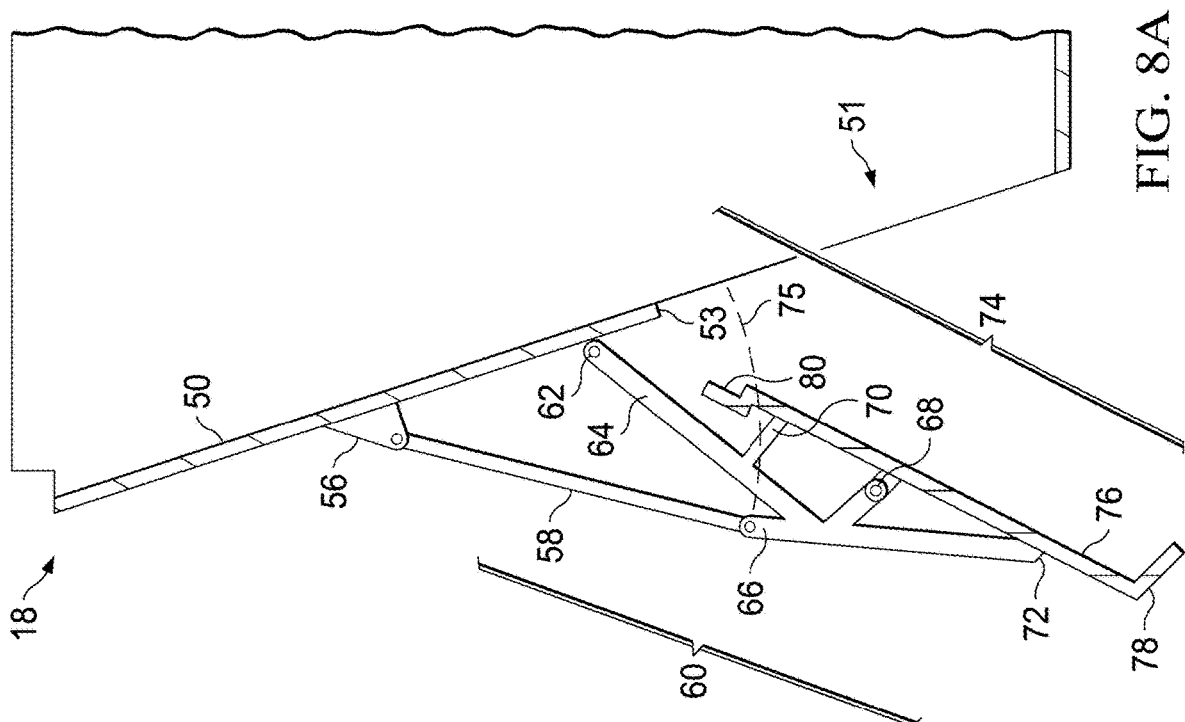

A mixing tub 50 comprises a reservoir for commodity material desired to be mixed. The scoop array 14 collects this material from commodity bays 20 (FIGS. 1, 2) and deposits this material into the mixing tub 50, where it is mixed, and from which it is released by an output device 18 (FIGS. 1, 8A-B). Because the mixing tub 50 is supported by the secondary carriage 4, and specifically, the first longitudinal support 36 and second longitudinal support 37, the first load measurement mechanism 6 detects the weight of the mixing tub 50 and its contents.

Figure 6:
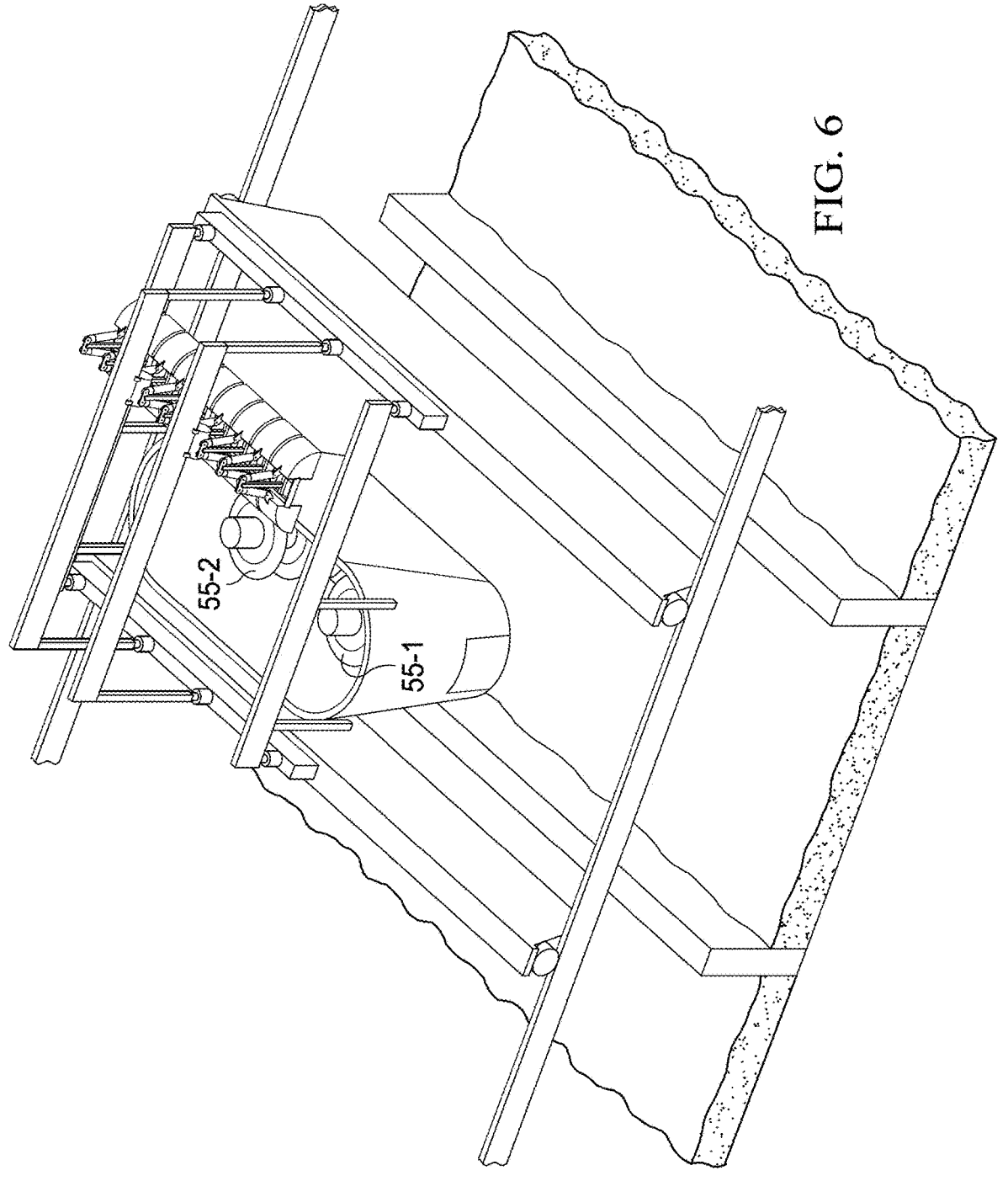
FIG. 6 is an overhead view of the system for mixing and transporting feed in which augers of the mixer assembly are depicted.

With momentary additional reference to FIG. 6, the mixer assembly 16 may also include one or more auger such as a first auger 55-1 and second auger 55-2. Each auger 55-1, 55-2 may comprise a rotatable screw in the mixing tub 50 that mixes the contents of the mixing tub 50 by rotating. In various embodiments, the mixer assembly 16 comprises two augers 55-1, 55-2, though any number of augers may be implemented. In various embodiments, the augers 55-1, 55-2 rotate at a first speed, for instance about 24 RPM during mixing, and at a second speed higher than the first speed, for instance, 35-38 RPM, during the unloading of the mixed commodity material from the mixing tub. In further embodiments, rather than augers, shaker plates, or pneumatic systems, or shaker tables or any other mixing mechanism may be used. For instance, in various embodiments, aqueous solutions or other fluid components may be mixed, wherein mixer blades, or impellers, or pumps, or further combinations of mixing mechanisms may be implemented.

Turning now to FIGS. 1-5, the scoop array 14 of the feed preparation system 2 may have various further aspects. A scoop array 14 may comprises a plurality of scoops 15. In various embodiments, the scoop array 14 comprises scoops of differing capacity, for instance, both large scoops and smaller scoops. By implementing scoops of differing sizes, as illustrated, for example, in FIG. 5, differing amounts of commodity material may be more rapidly collected and more precisely measured.

A scoop 15 may comprise a hinged clamshell closable about a commodity material. In further instances, a scoop 15 may comprise a bucket, such as may be articulated to collect commodity material. A scoop 15 may comprise a fluid collecting structure, such as a pump, or siphon or hose, or other mechanism as desired. In further embodiments, a scoop may comprise a sleeved auger or conveyer apparatus. Thus, one may appreciate that while a hinged clamshell structure is depicted herein, various other structures are contemplated.

A scoop 15 may have a closure mechanism 46. In various embodiments, the closure mechanism 46 causes a hinged clamshell of a scoop 15 to open and close about a hinge. In various instances, the closure mechanism 46 may be electrically, hydraulically or pneumatically actuated in response to a controller 1. In further instances, the closure mechanism 46 may be gravity operated. For instance, the closure mechanism 46 may be responsive to load such that, as commodity material begins to weigh down a scoop 15, the scoop is impelled increasingly to close, whereas as a scoop is lowered to rest, such as resting inside a mixing tub 50, the relaxation of gravitationally induced loading on a weight-bearing component of the scoop 15 causes the hinged clamshell of the scoop to open.

Finally, the scoop array 14 may comprise a lift mechanism 48. A lift mechanism may comprise a cable and an actuator responsive to controller 1. For instance, an actuator may be reposed within a first scoop carriage 54-1 of a secondary carriage 4. Similarly, an actuator may be reposed within a second scoop carriage 54-2 of a secondary carriage 4. The actuators may each retract or extend a cable, from which the scoop array 14 is hanging, thereby lifting or lowering the scoop array. The actuators may interoperate with a sensor, such as a position switch, to maintain the scoop array 14 in a desired orientation, such as level, as both actuators operate to raise or lower the scoop array 14.

Figure 7A:
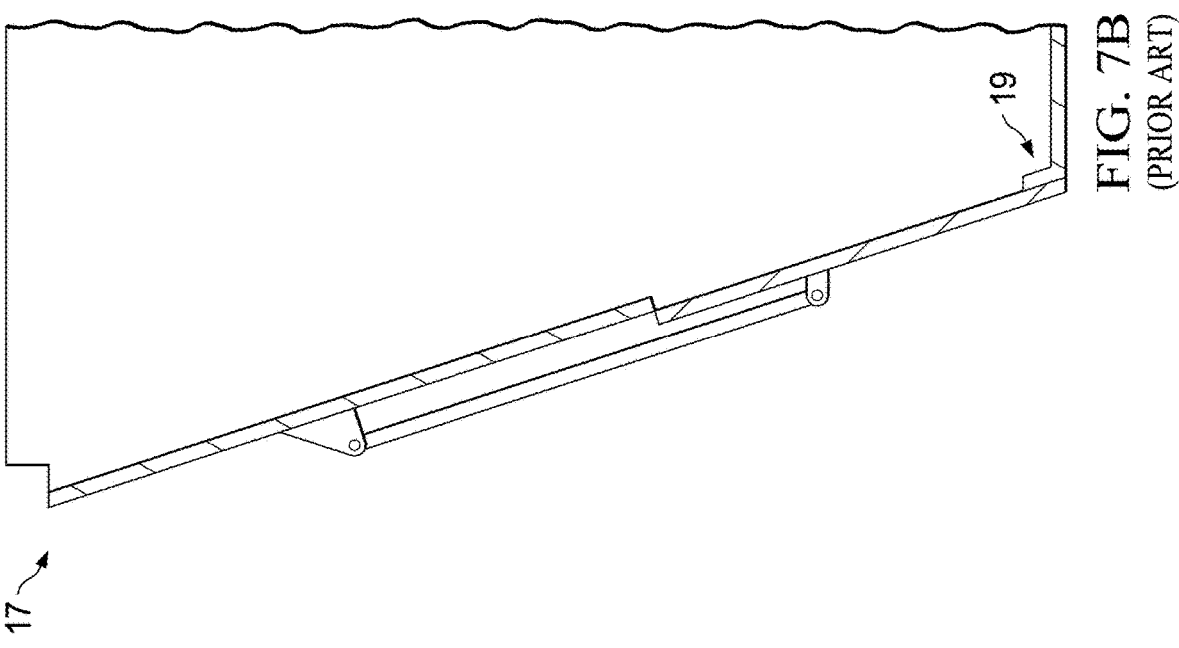
FIGS. 7A-B are views of a prior art door.
Figure 7B:
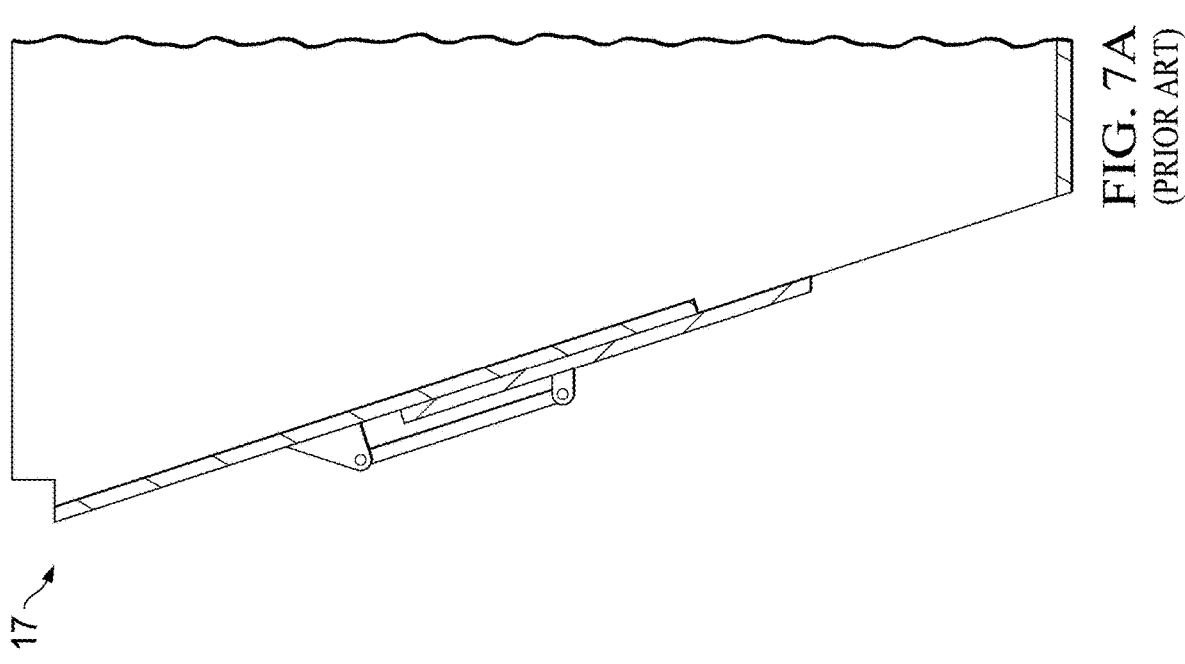

With reference to FIGS. 1, and 8A-B, the feed preparation system 2 may also comprise an output device 18. Prior art output devices are depicted in FIG. 7A-7B, which shows a door connectable to a mixing tub 50 and selectably openable. Notably however, the prior art output device 17 has a significant dead space 19 behind the door, wherein commodity material may become trapped, or may inadequately mix, and the door is prone to structural wear and potentially jamming and leakage.

In contrast, a novel output device 18 comprises a selectably openable door 74 attached to the mixing tub 50 and operable by a door lever 60 to permit a mixed content of the mixing tub 50 to be released to be deposited in an output receptacle 22 (FIG. 1), or a commodity bay 20 (FIG. 1, 2) such as when preparing premixed compositions for further mixing.

The output device 18 may comprise a hinge bracket 56, a cylinder, actuator or rod 58, a door lever 60 and a door 74. A hinge bracket 56 extends from a side of the mixing tub 50 and provides a rotatable connection to the cylinder 58. A cylinder 58 rotatably attaches to the hinge bracket 56 at a first end and rotatably attaches to a door lever 60 (and specifically, a rod attachment tab of a door lever 60) at a second end. The door lever 60 further attaches to a door 74. Thus, the cylinder 58 and door lever 60 constrain the movement of the door 74 to an actuation pathway 75 comprising an arc with a radius defined by the cylinder 58 and a center defined by the hinge bracket 56. For instance, the door 74 is directed along an actuation pathway 75 through an arcuate path upon opening and closing, whereby the door 74 lifts entirely away from the mixing tub 50 rather than merely hinging against the mixing tub 50. Further, the door lever 60 provides various tabs to further constrain movement of the door 74 at different points along the actuation pathway.

More specific attention is directed to the door lever 60. The door lever 60 may comprise a rod attachment 66, a door hinge 68, a door hinge arm 69, an upper stop arm 64, secondary upper stop arm 70, and a lower stop arm 72. A rod attachment 66 comprises a tab rotatably attachable to the cylinder 58. A door is connected to the door lever 60 at a door hinge 68. The door hinge 68 is a rotatable connection at an end of a door hinge arm 69 oriented generally normal to a surface of the door 74. However, as the door swivels on the door hinge 68, the door 74 may rotate so the surface of the door 74 is non-perpendicular relative to the door hinge arm 69 extending from the door hinge 68. This door hinge arm 69 terminates in a union with a lower stop arm 72. A lower stop arm 72 provides a contact surface to abut against a face of the door 74 to prevent the unconstrained rotation of the door 74 in a first direction (clockwise as illustrated in FIG. 8A-B). Also extending from the union between the aforementioned door hinge arm 69 and the lower stop arm 72, is an upper stop arm 64. The upper stop arm 64 extends to strike the side of the mixing tub 50 to prevent the unconstrained clockwise rotation of the entire door lever 60. Extending perpendicularly from the upper stop arm is a secondary upper stop arm 70. The secondary upper stop arm 70 provides the conjugate functionality of the lower stop arm 72, specifically, providing a contact surface to abut against a face of the door 74 to prevent the unconstrained rotation of the door in a second direction (counter clockwise as illustrated in FIG. 8A-B).

Further attention is also directed to the door 74. The door 74 is configured to selectably close the mixing tub 50 to regulate the unloading of commodity material from the tub. The door comprises a primary door plate 76 configured to close an opening 51 of the mixing tub 50. A primary door plate 76 is a planar sheet of metal, although in further embodiments, curves or other shapes may be implemented in order to properly fit the shape of the mixing tub 50.

The door 74 may also comprise a sealing foot 78. A sealing foot comprises a plate extending away from the primary door plate 76 at a lowermost end of the primary door plate 76. The sealing foot 78 nests over the floor of the mixing tub 50 so as to ameliorate leakage or the wear-induced development of gaps. Finally, the door 74 comprises an inset notch 80. The inset notch 80 is integrally formed with the primary door plate 76 at an opposite end from the sealing foot 78. The inset notch 80 comprises a bend and/or chamfer or cutaway portion of the door 74 configured to receive an edge 53 bounding an opening 51 in the mixing tub 50. The inset notch 80 may be inset a sufficient distance to receive entirely the thickness of the edge 53. In this manner, the inner surface 57 of the mixing tub 50 may align flush with the inner surface 77 of the door 74. This further ameliorates potential leakage, as well as ameliorating the potential for creation of a dead spot wherein commodity material may become trapped.

With reference now to FIGS. 1, 2, and 9-14, various methods of commodity preparation are presented. Momentarily returning focus to FIG. 1, a controller 1 may be in electronic communication with one or more of the first load measurement mechanism 6, the second load measurement mechanism 12, the first translation system 30, the second translation system 32, the first scoop carriage 54-1, the second scoop carriage 54-2, the output device 18, the augers 55-1, 55-2, and the individual scoops of the scoop array 14. The controller may variously actuate different aspects of these various components, or monitor the performance of these various components. In various embodiments, a user interface 3 connects to the controller 1 and provides human-readable output and accepts real-time instructions, and stored programs from a user. Thus, the controller 1 may be direct the controller 1 to perform various steps.

Figure 9:
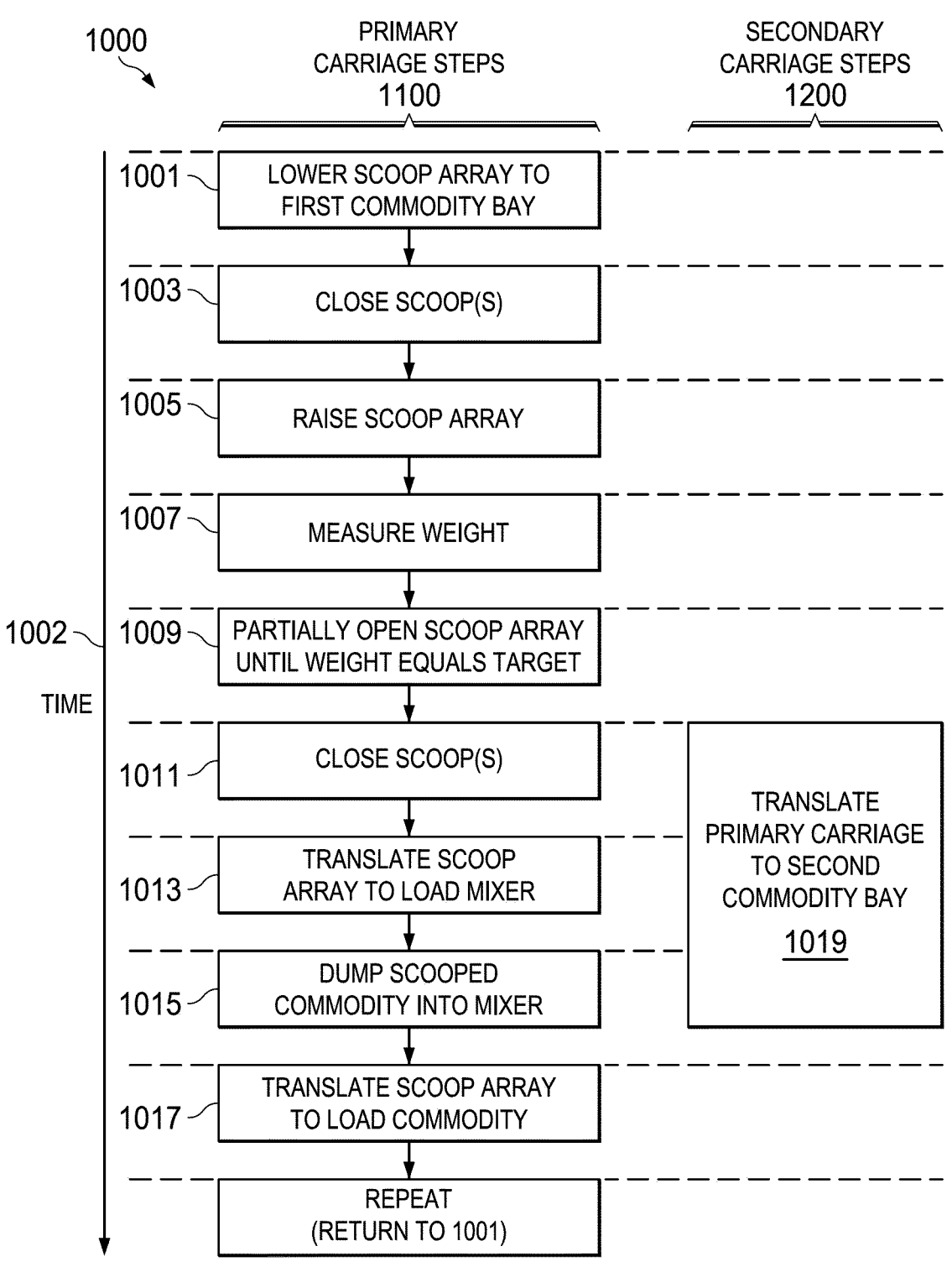
FIG. 9 is a block diagram of a method of commodity collection.
Figure 10:
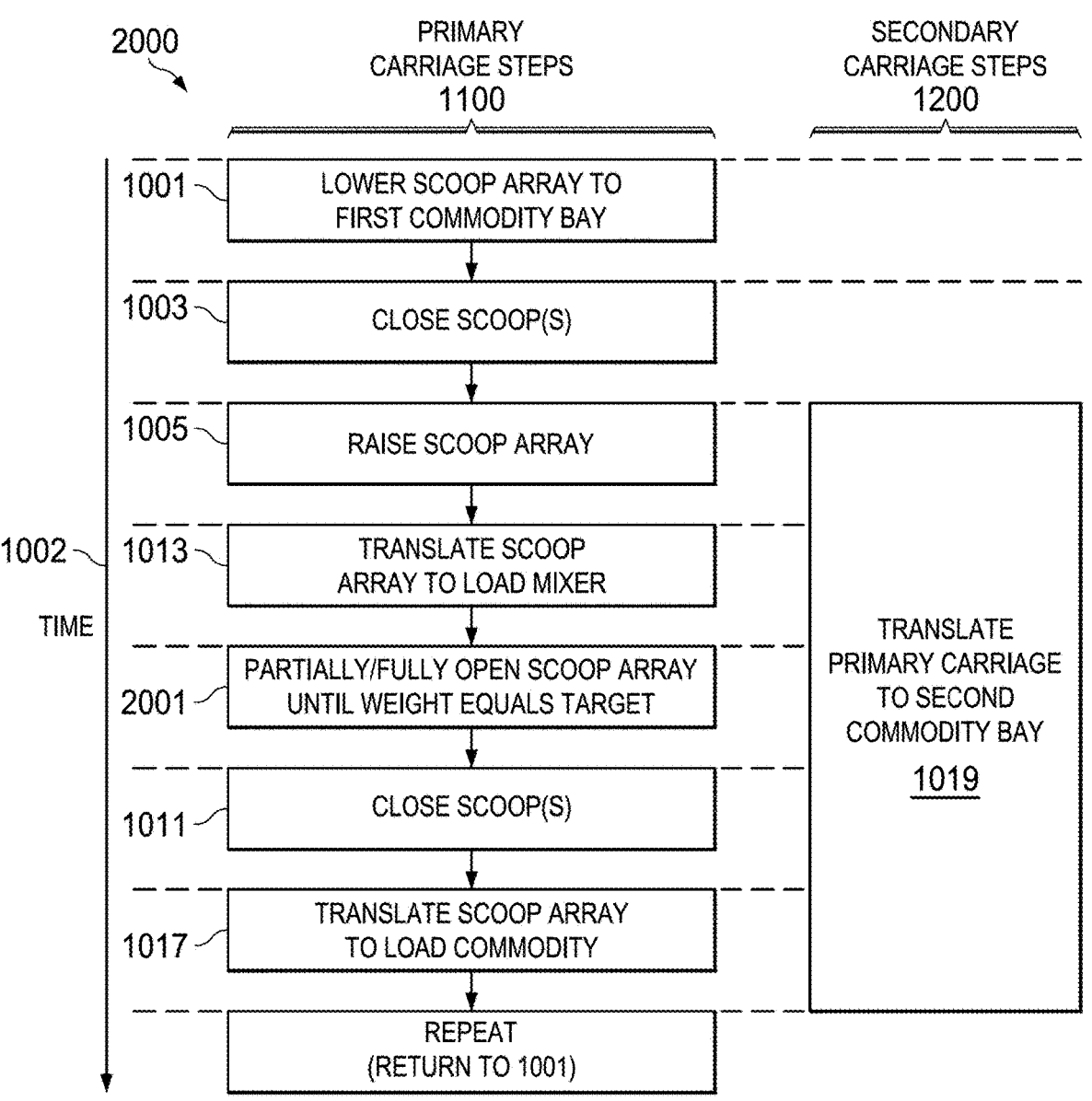
FIG. 10 is a block diagram of a method of commodity collection with mixing tub weighing.
Figure 11:
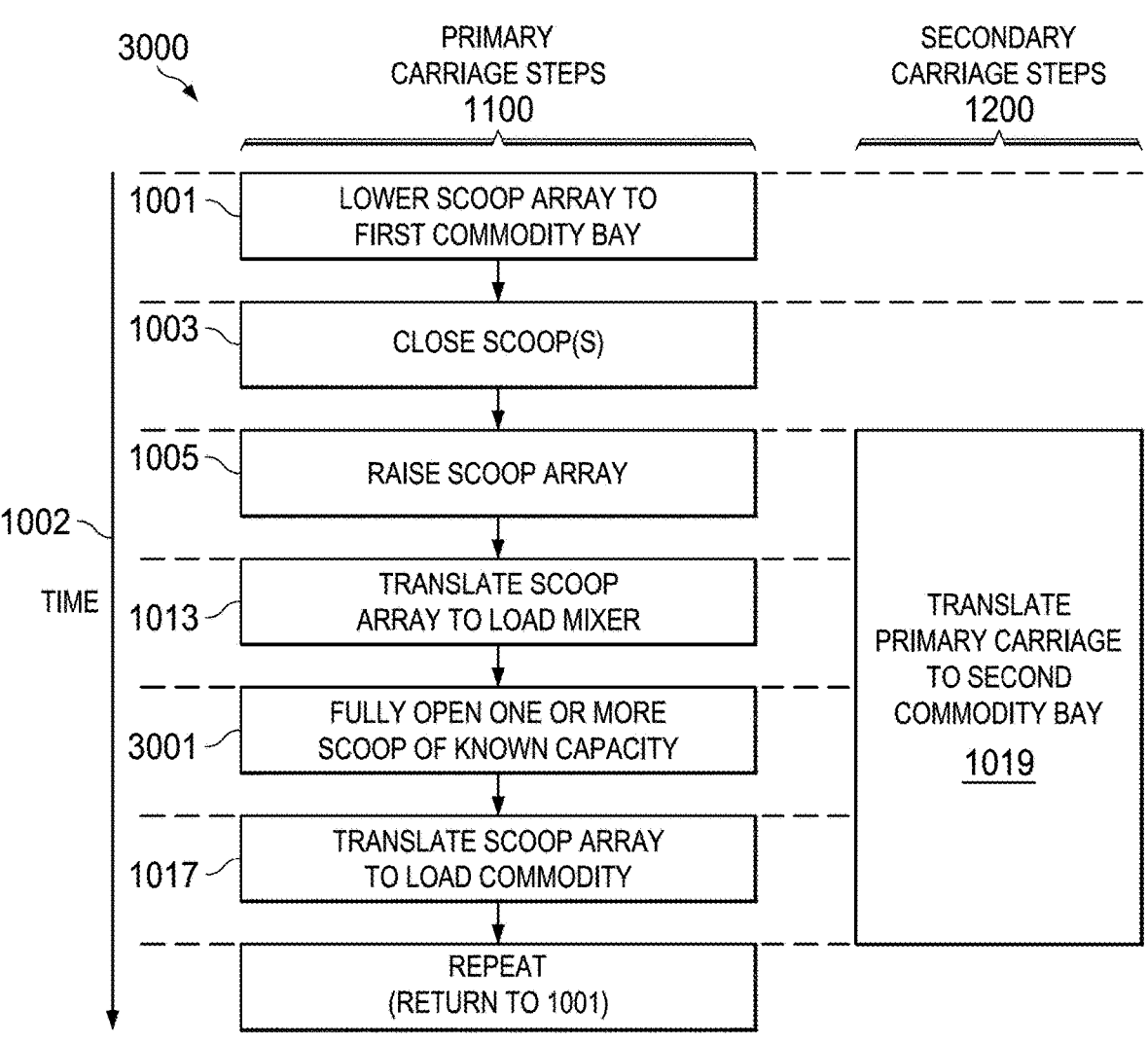
FIG. 11 is a block diagram of a method of commodity collection with known capacity scoops.

In various instances, different steps may be arranged so that the efficiency of operation of the system may be optimized. For instance, various steps may be conducted simultaneously, while others may be conducted sequentially. With reference to FIG. 9, a method of commodity preparation 1000 is disclosed. The method includes secondary carriage steps 1100 and primary carriages step(s) 1200. As time progresses 1002, different steps occur in sequence and different steps occur in parallel, as depicted. For instance, a scoop array may be lowered into a first commodity bay 20 (step 1001) (FIG. 2). One or more scoop of the scoop array may be closed to pick up commodity material (FIG. 3). In various instances, the scoops are of known same size, or of known different size, so that selective closure of particular scoops is known to collect a known amount of commodity material. In further embodiments, a weighing step is performed to determine the quantity of commodity material collected. For instance, the scoop array may be raised (step 1005) (FIG. 4) and the weight of commodity material measured by a first load measurement mechanism 6 (step 1007). In the event that the collected commodity material exceeds the desired weight, the controller 1 may direct one or more scoop of the scoop array to at least partially open until the weight reaches a target (step 1009). Subsequently the scoops of the scoop array are fully closed (step 1011) and the scoop array is translated by at least one scoop carriage 54-1 or 54-2 to be positioned overhead the mixing tub (step 1013). The scoop array dumps the commodity material into the mixing tub (step 1015) (FIG. 5) and the scoop array is translated in the opposite direction by at least one of the first and second scoop carriages 54-1, 54-2 (step 1017), staging the scoop array for the repetition of the process either at the same commodity bay in the event that more commodity material is desired to be collected, or a different commodity bay in the event that a different commodity material is desired to be collected. Thus, in simultaneity, during at least a portion of steps 1013, 1015, and 1017, the primary carriage may be conducting a parallel step of translating to a second commodity bay (step 1019). Thus, the system will be staged and ready to collect material from the second commodity bay.

Various other sequences may be implemented. For instance, with reference now to FIG. 10, a method of commodity collection with mixing tub weighing 2000 is presented. While FIG. 9 (method 1000) discussed measuring the weight of commodity material by a first load measurement mechanism 6, performing such measurement by the second load measurement mechanism 12 may permit simultaneous completion of different subsets of the secondary carriage steps 1100 and primary carriage steps 1200.

For example, a method of commodity preparation with mixing tub weighing 2000 is disclosed. The method includes secondary carriage steps 1100 and primary carriages step(s) 1200. As time progresses 1002, different steps occur in sequence and different steps occur in parallel, as depicted. For instance, a scoop array may be lowered into a first commodity bay 20 (step 1001) (FIG. 2). One or more scoop of the scoop array may be closed to pick up commodity material (FIG. 3). In various instances, the scoops are of known same size, or of known different size, so that selective closure of particular scoops is known to collect a known amount of commodity material. Subsequently the scoops of the scoop array are closed (step 1003) and the scoop array raised (step 1005) (FIG. 4) and the scoop array is translated by the first scoop carriage 54-1 and second scoop carriage

54-2 to be overhead the mixing tub (step 1013). One or more of the scoops of the scoop array are at least partially opened and the commodity is deposited into the mixing tub until the weight of the mixing tub (FIG. 5), as measured by the second load measurement mechanism 12 indicates that a desired weight of collected commodity material has been released into the mixing tub (step 2001). In various embodiments, the scoops are known to collect a known amount of commodity material and an entire scoop(s) is desired, so that the measuring may be omitted and the scoop is fully opened. In further embodiments, a quantity including a partial scoop is desired, so that the scoop is partially opened only until the desired quantity is released and emptied back into the bay 20, for example, then the scoops of the scoop array are closed (step 1011). In various embodiments, different scoops may have different commodity material and one or more may be desired to be opened or closed to differing degrees and at differing times. In such an embodiment, the first load measurement mechanism 6 may operate in simultaneity with the second load measurement mechanism 12 so that the portion of deposited commodity material attributable to each scoop is known, and the proper quantity of material released from each scoop may be controlled. As a consequence, the mixing process may be further expedited by eliminating repetitious steps of raising, opening, closing, lowering the scoop array 14 and instead, several scoops of several commodity materials may be collected, and then dumped into the mixing tub in unison.

Following the dumping step, the scoop array is translated in the opposite direction by the first and second scoop carriages 54-1, 54-2 (step 1017), staging the scoop array for the repetition of the process either at the same commodity bay in the event that more commodity material is desired to be collected, or a different commodity bay in the event that a different commodity material is desired to be collected. Thus, in simultaneity, during at least a portion of steps 1013, 2001, 2001, and 1017, the primary carriage may be conducting a parallel step of translating to a second commodity bay (step 1019). Thus, the system will be staged and ready to collect material from the second commodity bay.

Various other sequences may be implemented. For instance, with reference now to FIG. 11, a method of commodity collection with known capacity scoops 3000 is presented. The method 3000 may permit simultaneous completion of different subsets of the secondary carriage steps 1100 and primary carriage steps 1200.

Figure 4:
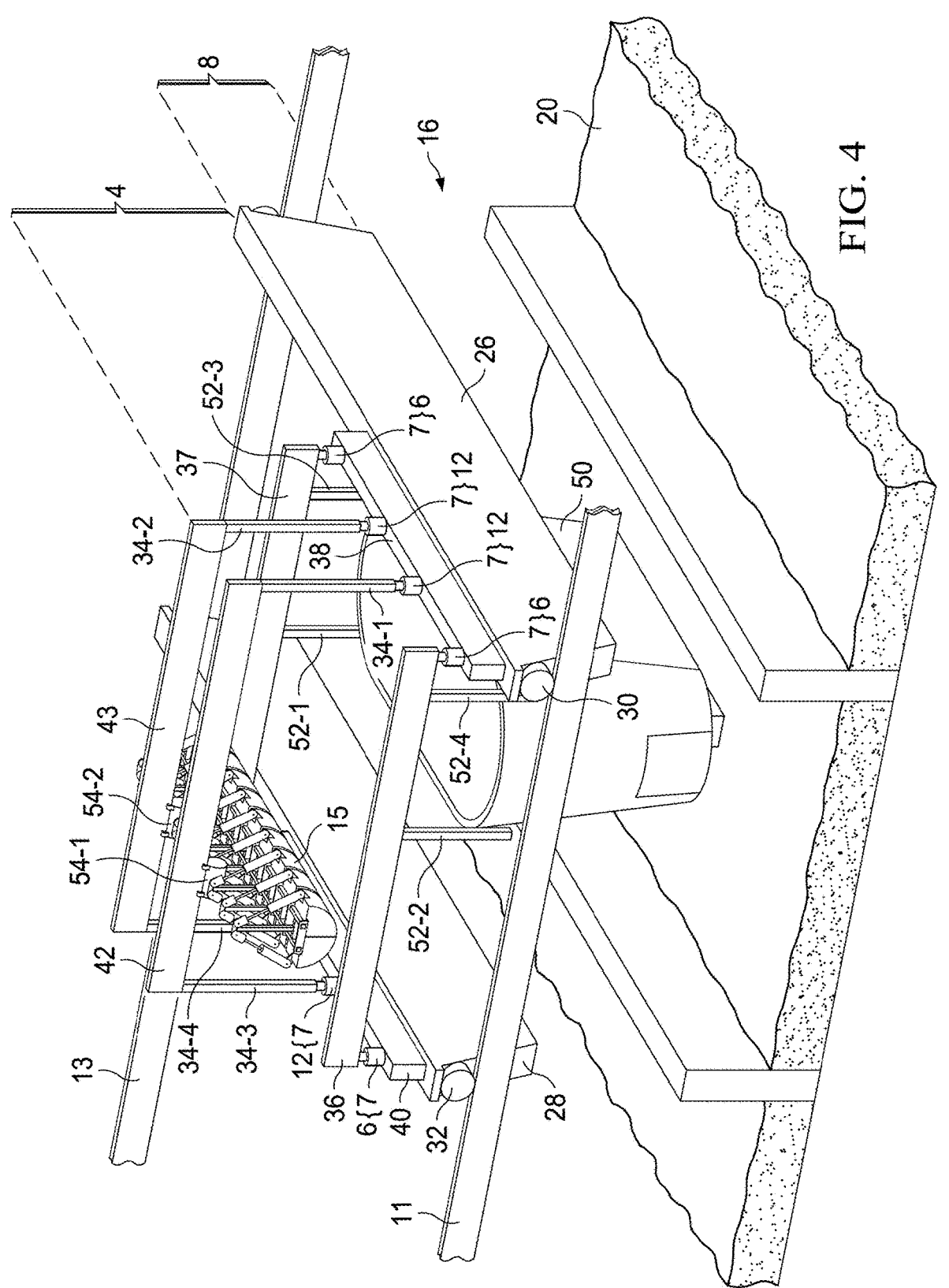
FIG. 4 is a side view of the system for mixing and transporting feed in which the scoop apparatus is elevated.
Figure 5:
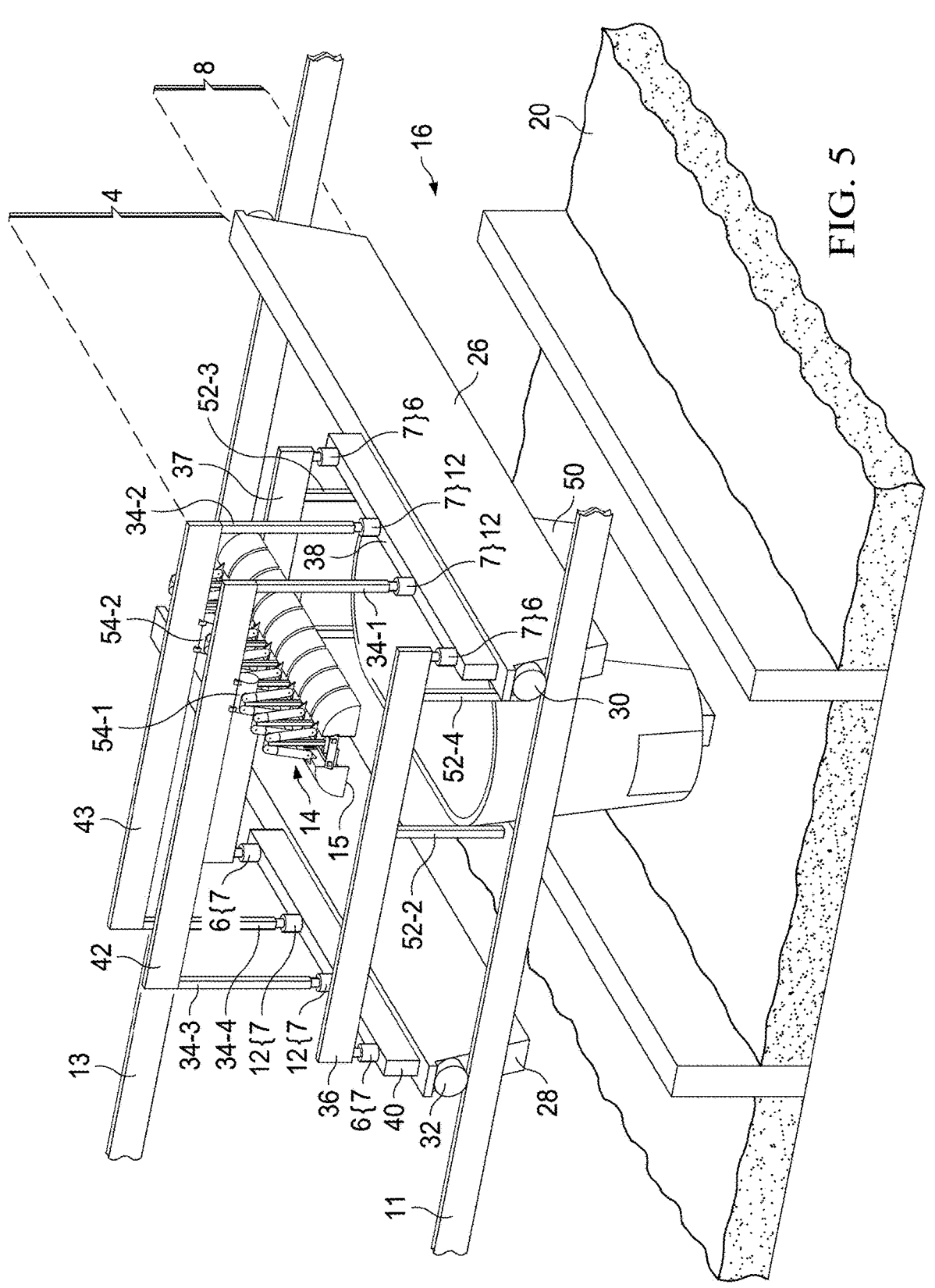
FIG. 5 is a side view of the system for mixing and transporting feed in which the scoop apparatus is elevated above a mixing tub of a mixer assembly in an open dumping position.

For example, a method of commodity preparation with known capacity scoops 3000 is disclosed. The method includes secondary carriage steps 1100 and primary carriages step(s) 1200. As time progresses 1002, different steps occur in sequence and different steps occur in parallel, as depicted. For instance, a scoop array may be lowered into a first commodity bay 20 (step 1001) (FIG. 2). One or more scoop of the scoop array may be closed to pick up commodity material (FIG. 3). In various instances, the scoops are of known same size, or of known different size, so that selective closure of particular scoops is known to collect a known amount of commodity material. The scoops of the scoop array are closed (step 1003) and the scoop array raised (step 1005) (FIG. 4). The scoop array is translated by either or both of the first scoop carriage 54-1 and second scoop carriage 54-2 to be overhead the mixing tub (step 1013). One or more of the scoops of the scoop array are fully opened (FIG. 5) and the commodity is deposited into the mixing tub (step 3001). Because, the scoops are known to collect a known amount of commodity material and an entire scoop(s) is desired, the measuring may be omitted and the scoop is fully opened. In various embodiments, different scoops may have different commodity material. In such an embodiment, the portion of deposited commodity material attributable to each scoop is known, so that an entire scoop comprises a proper quantity of material. As a consequence, the mixing process may be further expedited by eliminating repetitive steps of raising, opening, closing, lowering the scoop array 14 and instead, several scoops of several commodity materials may be collected, and then dumped into the mixing tub in unison.

Following the dumping step, the scoop array is translated in the opposite direction by the first and second scoop carriages 54-1, 54-2 (step 1017), staging the scoop array for the repetition of the process either at the same commodity bay in the event that more commodity material is desired to be collected, or a different commodity bay in the event that a different commodity material is desired to be collected. Thus, in simultaneity, during at least a portion of steps 1013, 3001, and 1017, the primary carriage may be conducting a parallel step of translating to a second commodity bay (step 1019). Thus, the system will be staged and ready to collect material from the second commodity bay.

The systems and methods discussed thus far may be implemented in automated processes to expedite the preparation of mixtures, such as animal feeds. For instance, with reference to FIG. 12, a first premix preparation method 4000 may include retrieving a first commodity from a first commodity bay (step 4001), retrieving a second commodity from a second commodity bay (step 4003), and retrieving any number N of n$^{th}$ commodity from a n$^{th}$ commodity bay (step 4005). The retrieved commodities may be mixed (step 4007) to form a first mixed component, which may be deposited in an N+1$^{th}$ commodity bay (step 4009).

Turning to FIG. 13, a subsequent second premix preparation method 5000 may be performed, including retrieving a third commodity from a third commodity bay (step S001), retrieving a fourth commodity from a fourth commodity bay (step S003) and retrieving any number M of m$^{th}$ commodity from a m$^{th}$ commodity bay (step S005). The retrieved commodities may be mixed (step S007) to form a second mixed component, which may be deposited in an M+1$^{th}$ commodity bay (step S009).

Following the performance of methods 4000 and 5000 (FIGS. 12-13) various premix compositions may be ready for rapid feed preparation. For instance, these methods may be performed at night or during a time of lowered system utilization, then, during periods of higher system utilization, the commodity components of different compositions may be prepared more rapidly due to the partial premixing. For instance, with reference to FIG. 14, a rapid feed preparation method 6000 may include retrieving a first quantity of first mixed component in a first scoop (step 6001), retrieving a second quantity of a second mixed component in a second scoop (step 6003). Notably, the first scoop and the second scoop may be of different sizes. The method may continue with retrieving a third quantity of a fifth commodity from a fifth commodity bay (step 6005). The mixing tub and auger(s) mix the retrieved commodities to form a material composition (step 6007). Finally the material composition is deposited into a receptacle (step 6009). As a consequence, seven different commodities from seven different commodity bays may be mixed, but the rapid feed preparation method 6000 only includes three retrieval steps, because of the earlier preparation of premixed components. Thus, during periods of high system demand, fewer steps are needed to finalize the material composition for delivery to an output receptacle. For instance, multiple trucks may be queued to retrieve different material compositions. By premixing a portion of the material compositions, the facility throughput may be improved so that trucks may be processed more rapidly.

It should be understood that feed preparation system 2 is not so limited to loading, mixing and transporting commodities to create feed for livestock or other animals. Indeed, system 2 may be used for loading, mixing and transporting any type of material, such as, for example, concrete.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms. As used herein, "longitudinal" is intended to mean along a longer axis of the system 2 (e.g., parallel to the track 10) and "transverse" is intended to mean perpendicular to longitudinal.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A feed preparation system comprising:
   a primary carriage movable along a track overhead a plurality of commodity bays;
   a secondary carriage supported by the primary carriage;
   a scoop array comprising a plurality of scoops, the scoop array supported by the secondary carriage; and
   a first load measurement mechanism disposed between the primary carriage and the secondary carriage and configured to measure a weight associated with the secondary carriage; and
   a tub hanging from the primary carriage and configured to receive a scooped commodity from the plurality of scoops of the scoop array.

2. The feed preparation system according to claim 1, wherein the scoops of the scoop array are configured to independently lower and raise and open and close.

3. The feed preparation system according to claim 1, wherein the scoop array is supported by the secondary carriage via a lift mechanism.

4. The feed preparation system according to claim 3, wherein the scoop array is configured to be lowered and raised by the lift mechanism, the plurality of scoops of the scoop array configured to independently open and close.

5. The feed preparation system according to claim 1, wherein the first load measurement mechanism is disposed between the primary carriage and the secondary carriage and measures a weight of the secondary carriage and scoop array.

6. The feed preparation system according to claim 1, further comprising a second load mechanism disposed between the tub and the primary carriage, the second load mechanism configured to measure a weight of the tub.

7. The feed preparation system according to claim 1, wherein the track comprises a first rail and a second rail parallel to the first rail.

8. The feed preparation system according to claim 1, wherein the primary carriage comprises:

a first transverse support and a second transverse support, each comprising a weight bearing member extending laterally across the first rail and second rail and each comprising a translation system configured to effectuate the translation of the primary carriage along the first rail and the second rail.

9. The feed preparation system according to claim 8, wherein the primary carriage further comprises:

a first transverse member parallel to the first transverse support;

a second transverse member parallel to the second transverse support;

a first longitudinal support comprising a first longitudinal weight bearing member extending longitudinally parallel to the first rail;

a second longitudinal support comprising a second longitudinal weight bearing member extending longitudinally parallel to the second rail; and a second load measurement mechanism comprising a plurality of load cells disposed between the first transverse member and the first and second longitudinal support, and between the second transverse member and first and second longitudinal support.

10. The feed preparation system according to claim 9, wherein a load cell of the plurality of load cells comprising the second load measurement mechanism is positioned at each intersection of a first and second transverse member and a first and second longitudinal support, whereby weight supported by the first and second longitudinal supports is measured.

11. The feed preparation system according to claim 10, wherein the secondary carriage comprises a plurality of upright arms extending upwardly from the first transverse member and the second transverse member of the primary carriage, wherein one upright arm of the plurality of upright arms is positioned at each distal end of each first and second transverse member, and wherein the first load measurement mechanism comprises load cells disposed between each upright arm of the plurality of upright arms and the corresponding first or second transverse member, whereby a weight supported by the secondary carriage is measured.

12. The system according to claim 1, wherein the tub comprises a mixer assembly, the mixer assembly further comprising an auger disposed within the tub and configured to mix commodities placed in the tub by the scoop array.

13. The system according to claim 1, wherein the plurality of scoops of the scoop array comprises a plurality of capacities.

14. The system according to claim 3, wherein the lift mechanism comprises a cable and an actuator responsive to a controller and configured to raise and lower the scoop array.

15. The system according to claim 1, wherein the tub comprises a door comprising:

a primary door plate configured to close an opening of the tub;

a sealing foot comprising a plate extending away from the primary door plate at a lowermost end of the primary door plate and nesting with a floor of the tub; and an inset notch integrally formed with the primary door plate at an opposite end from the sealing foot and comprising a cutaway portion of the door configured to receive an edge bounding the opening in the tub.

16. A feed preparation system comprising:

at least one carriage movable along an overhead track disposed overhead a plurality of commodity bays;

a scoop array hanging downwardly from the at least one carriage via a lift mechanism, the scoop array comprising two or more scoops; and a tub hanging from a carriage of the at least one carriage and configured to receive a scooped commodity from the scoop array, wherein the lift mechanism is movable towards and away from the tub, the scoops configured to be independently lowered toward and raised from the commodity bay to scoop a commodity from the commodity bay.

17. The feed preparation system according to claim 16, wherein the at least one carriage comprises at least one upper track and the lift mechanism is supported by one of the at least one upper tracks.

18. The feed preparation system according to claim 16, further comprising a load measurement mechanism disposed between the carriage and the lift mechanism, the load measurement mechanism configured to measure a weight associated with the scoop array.

19. The feed preparation system according to claim 16, further comprising a load measurement mechanism disposed between the carriage and the tub, the load measurement mechanism configured to measure a weight associated with the tub.

20. A method of preparing a pre-mixed feed, the method comprising:

moving a scoop array comprising a plurality of scoops to a first commodity bay;

lowering the scoop array to the first commodity bay;

closing a first scoop of the plurality of scoops to scoop a first commodity stored in the first commodity bay;

measuring the weight of the scooped first commodity held by the first scoop;

raising the scoop array from the first commodity bay;

moving the scoop array to a second commodity bay;

lowering the scoop array to the second commodity bay;

closing a second scoop of the plurality of scoops to scoop a second commodity stored in the second commodity bay;

measuring the weight of the scooped second commodity held by the second scoop;

raising the scoop array from the second commodity bay;

moving the scoop array to a third commodity bay;

lowering the scoop array to the third commodity bay;

closing a third scoop of the plurality of scoops to scoop a third commodity stored in the third commodity bay;

measuring the weight of the scooped third commodity held by the third scoop;

raising the scoop array from the third commodity bay;

moving the scoop array to a mixer and opening the first scoop, the second scoop, and the third scoop to deposit the scooped first commodity, the scooped second commodity, and the scooped third commodity in the mixer;

mixing the first commodity, the second commodity, and the third commodity deposited in the mixer to create a pre-mixed feed.

* * * * *